Dec. 27, 1960 S. G. ESKIN ET AL 2,966,062
THERMAL RESPONSIVE ELEMENT
Filed July 13, 1953
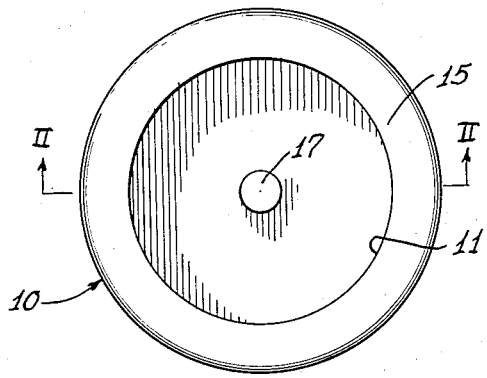
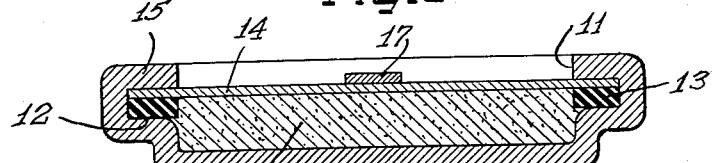
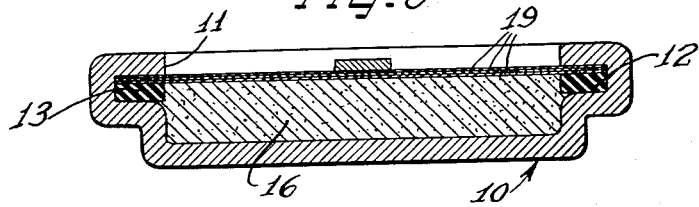
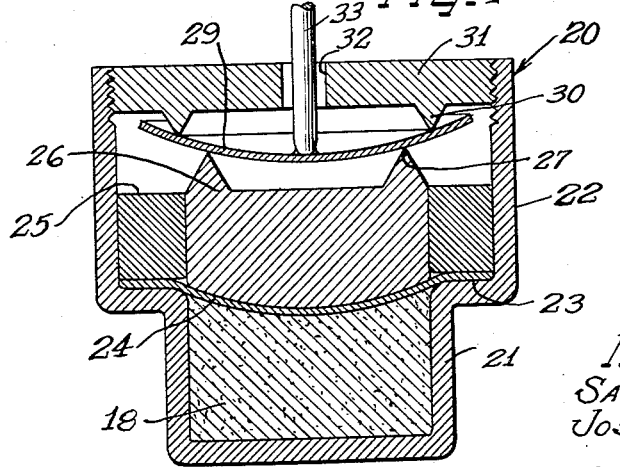
Inventors
SAMUEL G. ESKIN
JOSEPH M. ALGINO United States Patent Office 2,966,062
Patented Dec. 27, 1960

2,966,062

THERMAL RESPONSIVE ELEMENT

Samuel G. Eskin and Joseph M. Algino, Chicago, Ill., assignors to The Dole Valve Company, Chicago, Ill., a corporation of Illinois Filed July 13, 1953, Ser. No. 367,395

2 Claims. (Cl. 73—358)

This invention relates to improvements in thermostatic elements and has as its principal objects to provide such an element utilizing a thermal responsive semi-plastic mass as the temperature sensitive medium and of a simpler construction than formely with a minimum of moving parts.

A further object of our invention is to provide a thermostatic element in which the return spring for the element serves as a retainer for the thermally expansible material of the element.

A still further object of our invention is to provide a simple and inexpensive thermostatic element in which a metallic diaphragm contains a thermally expansible material within the casing for the element, enabling the element to be subjected to higher temperatures than former elements, by the elimination of the rubber diaphragm heretofore used, and acting as a return spring for the element.

A still further object of our invention is to provide a simple and inexpensive form of thermostatic element particularly adapted to operate snap acting mechanisms.

A still further object of our invention is to provide a simple and improved form of thermostatic element in which a plurality of metal diaphragms form retainers for a thermally expansible material within a casing for the thermostatic element, and are extended by the element upon predetermined temperature rises and retractably move the element within the casing as the temperature to which the element is subjected is reduced.

A further object and feature of the present invention is to provide a novel thermal responsive snap acting unit which has the advantages of a quick acting bi-metallic member with the power advantages of a body of confined thermally expansible material.

These and other objects of our invention will appear from time to time as the following specification proceeds and with reference to the accompanying drawing wherein Figure 1 is a top plan view of a thermostatic element constructed in accordance with our invention;

Figure 2 is a transverse sectional view taken through the element shown in Figure 1;

Figure 3 is a transverse sectional view taken through a modified form of thermostatic element constructed in accordance with our invention; and Figure 4 is a transverse sectional view taken through still another modified form of thermostatic element constructed in accordance with our invention, showing the element adapted for operating a snap acting mechanism.

In the embodiment of our invention illustrated in Figures 1 and 2 of the drawings, we have shown generally a dished container 10 having a relatively large diameter mouth 11 and a shoulder 12 extending outwardly from said mouth having a sealing member 13 seated thereon. The sealing member 13 may be a usual seal made from rubber, an elastomer and the like, and forms a seal for a metallic diaphragm or disk spring 14, resting on said sealing member and secured thereto by a flange 15. The flange 15 may be spun from the casing 10 into engagement with the top face of the metallic diaphragms 14.

Contained within the casing 10, by the metallic diaphragm 14, is a plastic or semi-plastic thermally expansible material, indicated generally by reference character 16. An example of such a material is a pellet material such as is shown and described in Patent No. 2,259,846, granted to Sergius Vernet on October 21, 1941. Such materials consist of a motive or power agent, which will expand or retract on change of temperature and which is of such fusible crystalline character that when combined with other materials, will undergo its change of state in the desired temperature range of operation of the thermostatic element, going into solution with or being somewhat mutually soluble with other materials serving as binders, so that the solution can be distributed as a thin film. Such materials are well known to the art and are clearly described in the aforementioned Vernet Patent No. 2,259,846 so need not herein be described further.

The metallic diaphragm 14 may be made of a stainless or spring steel and may have a button 17 on its outer side, which may be engageable with a device to be operated, for operating the same on extensible movement thereof. The diaphragm may also be made from Phosphor bronze or any other spring material.

When the casing 10 is in association with a medium being heated which may be water, air or any other desired medium, either immersed in the medium or having contact with the wall of the container therefor, as the temperature of the medium being heated increases, the thermally expansible material 16 contained within the casing 10 by the diaphragm or disk spring 14 will extend said diaphragm against its bias to operate the device to be operated thereby. As the temperature is reduced, the diaphragm 14 will tend to return to its biased position and contract the thermally expansible material within the casing 10 as shown in Figure 2 of the drawings.

It should here be noted that the diaphragm 14 never is strained beyond the limiting point from which it will return to its original position upon reductions in temperature and thus is effective as a retainer for the thermally expansible material as well as a return spring for the element.

In Figure 3 of the drawing, we have shown a thermostatic element similar to that shown in Figures 1 and 2, in which the diaphragm 14 is replaced by a plurality of steel spring disks or shims 19, 19. The shims 19, 19 may be made from stainless steel and are retained to the casing 10 by a spun flange 15, as in the form of our invention shown in Figures 1 and 2 and are normally biased in a retracted position, extending upon expansion of the thermally expansible material for operating a device to be operated, as in the form of our invention as shown in Figure 1.

One advantage of the form of our invention shown in Figure 3 is that the disk spring or diaphragm is in the form of several separate pieces, and the likelihood of the diaphragm acquiring a permanent set, which might occur in a solid spring diaphragm or disk is avoided.

In Figure 4 of the drawing, we have shown still another form in which our invention may be embodied, in which the device is shown as having operative connection with a snap acting device which may be used for operating a snap acting switch and the like.

In this form of our invention, we have shown a casing 20 having a reduced diameter portion 21 which may contain a thermally expansible material 18, such as the pellet material shown and described in the Vernet Patent No. 2,259,846. The casing 20 is shown as having an larged diameter portion 22, with a shoulder 23 at the junction of said portions. A spring disk or diaphragm 24 is shown as being in its biased retracted position, and as being maintained in position against the shoulder 23 by an annular retainer 25, serving as a guide for a plunger 26 having a bottom surface slidably engaged by the disk spring and conforming to the form thereof. The retainer 25 may be press fitted within the interior of the enlarged diameter part of the casing 20, to retain the spring disk 24 to the shoulder 23 of the casing, and to retain the thermally expansible material therein, to extend said spring against its bias upon predetermined temperature rises. If desired, a packing ring or other sealing device (not shown) may be interposed between the disk spring and the shoulder 23, as in the form of our invention illustrated in Figure 1. It is further obvious, that if desired the interior of the casing part 22 may be threaded for its length, and the retainer 25 threaded therein.

As the temperature to which the thermostatic element is subjected rises, the expansible material will extend the spring disk 24 as in the forms of my invention shown in Figures 1, 2 and 3. As the temperature drops below the critical operating point, the disk 24 will return to its biased position and return the thermal responsive material to its original position, it being understood that the disk 24 never passes over dead center.

The opposite face of the plunger 26 from the disk spring 24 is shown as having an annular knife edge 27 engaging a snap acting disk 29, commonly known as a clicker disk and being of a type well known to the art, so not herein described further. The annular knife edge 27 maintains the snap acting disk 29 in engagement with an annular knife edge 30, of a larger diameter than the knife edge 26. The knife edge 30 is herein shown as being formed integrally with the inner side of a closure member 31, threaded within the enlarged diameter portion 22 of the casing 20, and forming a cover therefor. The closure member 31 is shown as being apertured as indicated by reference character 32, and as having an operating rod 33 extending therethrough. The operating rod 33 is shown as being secured to the snap acting disk 29 for operating a switch, valve, or other device to be operated with a snap action, and not herein shown or described since it forms no part of our present invention.

When the thermostatic element is in the position shown in Figure 4 and upon predetermined temperature rises, the thermally expansible material within the reduced diameter part 21 of the casing 20 will move the disk spring 24 against its bias and extend the plunger 26 and flex the snap acting disk 29 up to a predetermined point, at which point the disk 29 will snap and move the operating rod 33 with a snap action to operate the device to be operated by the rod 33 with a snap action.

It may be seen from the foregoing that the thermostatic element of our invention is adapted for various uses where it is not required that the thermostatic element have a long length of travel, and that the element is of a far simpler and more inexpensive construction than the thermostatic elements heretofore known to the art, and that the simplicity, low cost and compactness is attained by the use of a metallic diaphragm or spring disk, serving as a retainer for the thermally expansible material, as well as a return spring for the element.

It will be understood that various modifications and variations of the present invention may be effected without departing from the spirit and scope of the novel concepts thereof.

We claim as our invention:

1. In a thermostatic element, a rigid non-deformable casing the inner margin of which defines a chamber having a wide mouth and having a shoulder extending outwardly from said mouth, a fusible thermally expansible material within said casing, a seal on said shoulder, a plurality of separate thin spring-tempered, self-returning metal disks on said seal and means sealing said disks to said seal at their outer marginal portions, the inner portions of said disks being free for relative movement with respect to each other during expansion or retraction of said body of thermally expansible material and contracting the thermally expansible material within said casing upon predetermined reductions in temperature.

2. In a thermostatic element, a chamber having a relatively wide mouth and having a shoulder extending from said mouth with an annular wall extending from said shoulder, a body of fusible thermally expansible material within said container, a metallic disk engaging said shoulder and having a predetermined inward curvature and extending within said chamber upon normal temperature conditions, an annular retainer maintaining said disk in engagement with said shoulder, a plunger slidably guided in said retainer and having an inner wall conforming to the curvature of said spring disk when in its contracted position and also having spaced knife edges portions, a closure for said annular wall, said closure having inwardly extending spaced knife edge portions spaced outwardly from the knife edge portions of said plunger and adjacent the same, and a snap acting disk interposed between said knife edge portions for operating the device to be operated with a snap action when the temperature to which the thermostatic element is subjected reaches the operating range of the element.

References Cited in the file of this patent

UNITED STATES PATENTS

| 1,194,029 | Kercher | Aug. 8, 1916 |
|---|---|---|
| 1,348,420 | Hurlbut | Aug. 3, 1920 |
| 1,633,908 | Schnepp | June 28, 1927 |
| 1,646,548 | Moclaren | Oct. 25, 1927 |
| 1,821,950 | Stout | Sept. 8, 1931 |
| 1,822,408 | King | Sept. 8, 1931 |
| 1,884,794 | McKee | Oct. 25, 1932 |
| 2,128,274 | Vernet | Aug. 30, 1938 |
| 2,265,586 | Vernet | Dec. 9, 1941 |
| 2,357,215 | Maronek | Aug. 29, 1944 |
| 2,368,181 | Vernet | Jan. 30, 1945 |
| 2,548,941 | Brown | Apr. 17, 1951 |
| 2,565,847 | Hilgert | Aug. 28, 1951 |
| 2,667,182 | Rostu | Jan. 26, 1954 |
| 2,694,415 | Dillon | Nov. 16, 1954 |

FOREIGN PATENTS

| 327,978 | Great Britain | Apr. 14, 1930 |
|---|---|---|
| 531,280 | Great Britain | Jan. 1, 1941 |